US011315334B1

(12) United States Patent
Peuhkurinen et al.

(10) Patent No.: US 11,315,334 B1
(45) Date of Patent: Apr. 26, 2022

(54) DISPLAY APPARATUSES AND METHODS INCORPORATING IMAGE MASKING

(71) Applicant: Varjo Technologies Oy, Helsinki (FI)

(72) Inventors: Ari Antti Erik Peuhkurinen, Helsinki (FI); Ville Timonen, Helsinki (FI); Niki Dobrev, Helsinki (FI)

(73) Assignee: Varjo Technologies Oy, Helsinki (FI)

( * ) Notice: Subject to any disclaimer, the term of this patent is extended or adjusted under 35 U.S.C. 154(b) by 0 days.

(21) Appl. No.: 17/171,392

(22) Filed: Feb. 9, 2021

(51) Int. Cl.
*G06T 7/50* (2017.01)
*G06T 7/70* (2017.01)
*G06T 17/00* (2006.01)
*G06T 19/00* (2011.01)
*G06F 3/01* (2006.01)

(52) U.S. Cl.
CPC ............ *G06T 19/006* (2013.01); *G06F 3/012* (2013.01); *G06T 7/50* (2017.01); *G06T 7/70* (2017.01); *G06T 17/00* (2013.01); *G06T 2207/10028* (2013.01)

(58) Field of Classification Search
CPC ......... G06T 19/006; G06T 7/70; G06T 17/00; G06T 7/50; G06T 2207/10028; G06F 3/012
See application file for complete search history.

(56) References Cited

U.S. PATENT DOCUMENTS

| 2012/0013613 A1* | 1/2012 | Vesely ................ G06F 3/04815 345/419 |
| 2013/0083011 A1* | 4/2013 | Geisner ................ G02B 27/017 345/419 |
| 2013/0234934 A1* | 9/2013 | Champion ............ G06F 3/0304 345/156 |

\* cited by examiner

*Primary Examiner* — Jitesh Patel
(74) *Attorney, Agent, or Firm* — Ziegler IP Law Group, LLC (57) ABSTRACT

A display apparatus including light source(s), camera(s), head-tracking means, and processor configured to: obtain three-dimensional model of real-world environment; control camera(s) to capture given image of real-world environment, whilst processing head-tracking data obtained from head-tracking means to determine pose of users head with respect to which given image is captured; determine region of three-dimensional model that corresponds to said pose of users head; compare plurality of features extracted from region of three-dimensional model with plurality of features extracted from given image, to detect object(s) present in real-world environment; employ environment map of extended-reality environment to generate intermediate extended-reality image based on pose of users head; embed object(s) in intermediate extended-reality image to generate extended-reality image; and display extended-reality image via light source(s).

14 Claims, 4 Drawing Sheets

DISPLAY APPARATUSES AND METHODS INCORPORATING IMAGE MASKING

TECHNICAL FIELD

The present disclosure relates to display apparatuses incorporating image masking. Moreover, the present disclosure relates to methods of displaying that are implemented by such display apparatuses.

BACKGROUND

Immersive extended-reality (XR) technologies such as virtual-reality (VR), augmented-reality (AR), mixed-reality (MR), and the like, are increasingly being employed nowadays in various fields such as entertainment, real estate, training, medical imaging operations, simulators, navigation, and the like. Such immersive XR technologies create immersive XR environments.

Typically, a user of an XR device wears the XR device on his/her head to experience an XR environment. The user is present in a real-world environment which may, for example, be an indoor environment or an outdoor environment. The real-world environment includes real objects present therein. In some XR environments, it is desirable to show at least some of these real objects along with virtual content (such as virtual objects). The virtual content is computer-generated content.

Existing technologies for generating XR images constituting these XR environments including both real and virtual parts have several limitations. These technologies are limited in their ability to perform occlusion between the real and virtual parts of the XR environments, thereby undesirably compromising on realism and immersiveness in the XR environments. When the real and virtual objects are occluded improperly, the XR image appears unnatural to the user.

Therefore, in light of the foregoing discussion, there exists a need to overcome the aforementioned drawbacks associated with the existing display apparatuses for presenting XR environments.

SUMMARY

The present disclosure seeks to provide a display apparatus incorporating image masking. The present disclosure also seeks to provide a method of displaying that is implemented by such a display apparatus. An aim of the present disclosure is to provide a solution that overcomes at least partially the problems encountered in prior art.

In one aspect, an embodiment of the present disclosure provides a display apparatus comprising:
- at least one light source;
- at least one camera;
- head-tracking means; and
- at least one processor configured to:
  - obtain a three-dimensional model of a real-world environment;
  - control the at least one camera to capture a given image of the real-world environment, whilst processing head-tracking data obtained from the head-tracking means to determine a pose of a users head with respect to which the given image is captured;
  - determine a region of the three-dimensional model that corresponds to said pose of the users head;
  - compare a plurality of features extracted from the region of the three-dimensional model with a plurality of features extracted from the given image, to detect at least one object present in the real-world environment;
  - employ an environment map of an extended-reality environment to generate an intermediate extended-reality image based on the pose of the users head;
  - embed the at least one object in the intermediate extended-reality image to generate an extended-reality image; and
  - display the extended-reality image via the at least one light source.

In another aspect, an embodiment of the present disclosure provides a method of displaying, the method being implemented by a display apparatus comprising at least one light source, at least one camera, and head-tracking means, the method comprising:
- obtaining a three-dimensional model of a real-world environment;
- controlling the at least one camera to capture a given image of the real-world environment, whilst processing head-tracking data obtained from the head-tracking means to determine a pose of a users head with respect to which the given image is captured;
- determining a region of the three-dimensional model that corresponds to said pose of the users head;
- comparing a plurality of features extracted from the region of the three-dimensional model with a plurality of features extracted from the given image, to detect at least one object present in the real-world environment;
- employing an environment map of an extended-reality environment to generate an intermediate extended-reality image based on the pose of the users head;
- embedding the at least one object in the intermediate extended-reality image to generate an extended-reality image; and
- displaying the extended-reality image via the at least one light source.

Embodiments of the present disclosure substantially eliminate or at least partially address the aforementioned problems in the prior art, and enable presentation of realistic (namely, natural-looking) extended-reality images for presentation of immersive extended-reality environments.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIG. 3B is an exemplary illustration of a given image of the real-world environment that is captured by at least one camera of a display apparatus, while

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a display apparatus comprising:
at least one light source;
at least one camera;
head-tracking means; and
at least one processor configured to:
  obtain a three-dimensional model of a real-world environment;
  control the at least one camera to capture a given image of the real-world environment, whilst processing head-tracking data obtained from the head-tracking means to determine a pose of a user's head with respect to which the given image is captured;
  determine a region of the three-dimensional model that corresponds to said pose of the user's head;
  compare a plurality of features extracted from the region of the three-dimensional model with a plurality of features extracted from the given image, to detect at least one object present in the real-world environment;
  employ an environment map of an extended-reality environment to generate an intermediate extended-reality image based on the pose of the users head;
  embed the at least one object in the intermediate extended-reality image to generate an extended-reality image; and
  display the extended-reality image via the at least one light source.

In another aspect, an embodiment of the present disclosure provides a method of displaying, the method being implemented by a display apparatus comprising at least one light source, at least one camera, and head-tracking means, the method comprising:
obtaining a three-dimensional model of a real-world environment;
controlling the at least one camera to capture a given image of the real-world environment, whilst processing head-tracking data obtained from the head-tracking means to determine a pose of a users head with respect to which the given image is captured;
determining a region of the three-dimensional model that corresponds to said pose of the users head;
comparing a plurality of features extracted from the region of the three-dimensional model with a plurality of features extracted from the given image, to detect at least one object present in the real-world environment;
employing an environment map of an extended-reality environment to generate an intermediate extended-reality image based on the pose of the users head;
embedding the at least one object in the intermediate extended-reality image to generate an extended-reality image; and
displaying the extended-reality image via the at least one light source.

The present disclosure provides the aforementioned display apparatus and the aforementioned method of displaying. The display apparatus presents realistic extended-reality (XR) images to a user of the display apparatus. By utilizing both the three-dimensional (3D) model and the given image of the real-world environment to detect the at least one object present in the real-world environment, and embedding the at least one object in the intermediate XR image, natural-looking XR images are generated for displaying. This improves immersiveness in XR environments and enhances a viewing experience for the user using the display apparatus. In the display apparatus, real and virtual parts of the XR images are occluded realistically to provide this enhanced viewing experience.

Throughout the present disclosure, the term "display apparatus" refers to a display system that is configured to present an extended-reality (XR) environment to the user when the display apparatus in operation is used by the user. Herein, the term "extended-reality" encompasses virtual reality (VR), augmented reality (AR), mixed reality (MR), and the like.

In one implementation, the display apparatus is implemented as a head-mounted device (HMD) and a computer coupled to the HMD. In one case, the HMD comprises the at least one light source, the at least one camera, and the head-tracking means, while the computer comprises the at least one processor. Therefore, computational tasks pertaining to presentation of the XR environment are entirely performed at the computer, by the at least one processor. In another case, the HMD comprises the at least one light source, the at least one camera, and the head-tracking means, and the at least one processor is implemented at both the HMD and the computer. Therefore, computational tasks pertaining to presentation of the XR environment are performed in a shared manner at both the HMD and the computer, by the at least one processor. The computer may be coupled to the HMD wirelessly and/or in a wired manner. Examples of the computer include, but are not limited to, a desktop computer, a laptop computer, a tablet computer, a workstation, and an XR console.

In another implementation, the display apparatus is implemented as an HMD. In such a case, the HMD comprises the at least one light source, the at least one camera, and the head-tracking means, and the at least one processor. Therefore, computational tasks pertaining to presentation of the XR environment are entirely performed at the HMD, by the at least one processor.

It will be appreciated that the HMD is worn by the user on his/her head. The HMD is implemented, for example, as an XR headset, a pair of XR glasses, and the like, that is operable to display a visual scene of the XR environment to the user.

Throughout the present disclosure, the term "light source" refers to an element from which light emanates. Optionally, a given light source is implemented as a display. In this regard, a given XR image is displayed at the given light source. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Optionally, a given light source is implemented as a projector. In this regard, a given XR image is projected onto a projection screen or directly onto a retina of the users eyes. Examples of the projector include, but are not limited to, an LCD-based projector, an LED-based projector, an OLED-based projector, an LCoS-based projector, a Digital Light Processing (DLP)-based projector, and a laser projector.

Optionally, a given light source could be a multi-resolution light source, or a single-resolution light source. Multi-resolution light sources are configured to display images at two or more resolutions, whereas single-resolution light sources are configured to display images at a single resolution only. Optionally, the display apparatus comprises one light source per eye, wherein each light source is a multi-resolution light source. Alternatively, optionally, the display apparatus comprises at least two light sources per eye, the at least two light sources comprising at least one first light source and at least one second light source, wherein the at least one first light source is configured to display first XR images at a first resolution and the at least one second light source is configured to display second XR images at a second resolution, the second resolution being higher than the first resolution.

Throughout the present disclosure, the term "camera" refers to an equipment that is operable to detect and process signals received from the real-world environment, so as to capture the given image of the real-world environment. These signals could be light waves, sound signals, or similar. Optionally, the at least one camera is implemented as at least one of: a visible light camera, a depth camera. Examples of the visible light camera include, but are not limited to, a Red-Green-Blue-Depth (RGB), monochrome camera. Examples of the depth camera include, but are not limited to, a Red-Green-Blue-Depth (RGB-D) camera, a ranging camera, a Light Detection and Ranging (LiDAR) camera, a flash LiDAR camera, a Time-of-Flight (ToF) camera, a Sound Navigation and Ranging (SONAR) camera, a laser rangefinder, a stereo camera, a plenoptic camera, an infrared camera, a structured-light scanner, and an ultrasound imaging equipment. It will be appreciated that a given camera could be implemented as a combination of both the visible light camera (i.e. a colour camera) and the depth camera. For example, the given camera may be implemented as the stereo camera.

It will be appreciated that the at least one camera is arranged to capture the given image of the real-world environment from a perspective of the pose of the users head, wherein the given image is utilized to provide a Video See-Through (VST) experience to the user. In this regard, the at least one camera is arranged on an outer surface of the HMD facing the real-world environment.

Throughout the present disclosure, the term "head-tracking means" refers to specialized equipment that is employed to detect and/or follow the pose of the user's head within the real-world environment. The term "pose" encompasses both position and orientation. In practice, the head-tracking means is actually employed to track a pose of the HMD; the pose of the users head corresponds to the pose of the HMD as the HMD is worn by the user on his/her head. Pursuant to embodiments of the present disclosure, the head-tracking means is implemented as a true six Degrees of Freedom (6DoF) tracking system. In other words, the head-tracking means tracks both the position and the orientation of the user's head within a three-dimensional (3D) space of the real-world environment.

The head-tracking means could be implemented as an internal component of the HMD, as a tracking system external to the HMD, or as a combination thereof. The head-tracking means could be implemented as at least one of: an optics-based tracking system (which utilizes, for example, infrared beacons and detectors, infrared cameras, visible-light cameras, detectable objects and detectors, and the like), an acoustics-based tracking system, a radio-based tracking system, a magnetism-based tracking system, an accelerometer, a gyroscope, an Inertial Measurement Unit (IMU), a Timing and Inertial Measurement Unit (TIMU). As an example, a detectable object may be an active infra-red (IR) LED, a visible LED, a laser illuminator, a Quick Response (QR) code, an ArUco marker, an anchor marker, a Radio Frequency Identification (RFID) marker, and the like. A detector may be implemented as at least one of: an IR camera, an IR transceiver, a visible light camera, an RFID reader. As another example, the magnetism-based tracking system may be implemented as a transmitter that is capable of generating an active magnetic field in the real-world environment and at least one receiver that is capable of sensing the magnetic field, the at least one receiver being installed into the HMD. Such head-tracking means are well-known in the art. Moreover, the head-tracking means employs either an outside-in tracking technique or an inside-out tracking technique for collecting the head-tracking data pertaining to the pose of the users head.

The at least one processor is communicably coupled to the at least one light source, the at least one camera, and the head-tracking means. It will be appreciated that any such coupling can be wireless and/or wired. The at least one processor could be a processor of the HMD and/or a processor of the computer communicably coupled to the HMD. The at least one processor may be understood to be a compositor (namely, a processing unit that is configured to perform at least the compositing tasks).

Throughout the present disclosure, the term "real-world environment" refers to a physical environment in which the user is present. The "three-dimensional model of the real-world environment" refers to a data structure that comprises comprehensive information pertaining to a 3D space of the real-world environment. This comprehensive information pertaining to the real-world environment is indicative of at least one of: features of objects present in the real-world environment, shapes of the objects or their portions, optical depths of the objects or their portions, materials of the objects or their portions, colours of the objects or their portions, light sources and lighting conditions within the real-world environment, detectable markers arranged within the real-world environment. The 3D model of the real-world environment could be in a form of: an environment map, a photogrammetric model, a point cloud, or a 3D data structure that is based on triangles, non-uniform rational basis splines (NURBS) or other surfaces, or voxels. Other suitable forms of the 3D model are also feasible.

It will be appreciated that the 3D model of the real-world environment could be previously created prior to start of a viewing session of the display apparatus, or may be created at the start of the viewing session. Moreover, optionally, the 3D model of the real-world environment is updated dynamically during the viewing session, based on images of the real-world environment that are captured by the at least one camera during the viewing session. In this case, the dynamic updating may occur in real time or near-real time. In an example, the shapes of the objects or their portions may be updated based on features of objects that are extracted using real-time images of the real-world environment and up-to-date optical depths of the objects or their portions. These up-to-date optical depths may be obtained using depth sensors. These depth sensors may be arranged as separate components on the HMD or may be integrated into the at least one camera when the at least one camera is implemented as at least one depth camera. In another example, the materials of the objects or their portions may be determined by estimating reflections (diffuse reflections and/or specular reflections) and/or refractions occurring at surfaces of the objects or their portions, based on the shapes of the objects or their portions, the colours of the objects or their portions as viewed from different view directions, and optionally the light sources and lighting conditions within the real-world environment. In yet another example, the light sources and lighting conditions within the real-world environment may be estimated and updated based on sensor data of light sensors in the real-world environment, detected shadows in the real-time images of the real-world environment, the shapes of the objects or their portions, and the like. The lighting conditions may, for example, be determined via High-Dynamic-Range (HDR) imaging, and may be recorded as an HDR map.

In an embodiment, when obtaining the three-dimensional model of the real-world environment, the at least one processor is configured to:
  control the at least one camera to capture a plurality of images of the real-world environment, whilst processing head-tracking data obtained from the head-tracking means to determine corresponding poses of the users head with respect to which the plurality of images are captured; and
  process the plurality of images, based on the corresponding poses of the users head, to create the three-dimensional model of the real-world environment.

In this regard, the poses of the users head are determined in a coordinate system associated with the 3D space of the real-world environment. It will be appreciated that the plurality of images are processed along with the corresponding poses of the users head, to enable the at least one processor to identify features in the plurality of images and to generate the comprehensive information constituting the 3D model (for example, such as photogrammetry data) from various perspectives of the poses of the users head. The 3D model produced in such a manner is highly accurate (in terms of reconstructing the real-world environment) and is information-rich.

Optionally, when processing the plurality of images to create the three-dimensional model of the real-world environment, the at least one processor is configured to employ at least one data processing algorithm. Optionally, the at least one data processing algorithm is at least one of: a feature recognition algorithm, an image stitching algorithm, an image merging algorithm, an interpolation algorithm, a 3D modelling algorithm, a photogrammetry algorithm. Such data processing algorithms are well-known in the art. As an example, the at least one processor may employ a 3D modelling algorithm for 3D reconstruction of the real-world environment using the plurality of images, to create the 3D model of the real-world environment.

Optionally, when processing the plurality of images to create the 3D model of the real-world environment, the at least one processor is configured to generate image data for non-capturing regions of the plurality of images by employing at least one inpainting algorithm. A non-capturing region of a given image is that region which does not represent any visual information of the real-world environment, since such a region is not captured by the at least one camera. Optionally, the at least one inpainting algorithm is at least one of: a Fast Marching Method (FMM) algorithm, a Navier Stokes (NS) based inpainting algorithm, a coherence transport based inpainting algorithm, an exemplar-based inpainting algorithm, Criminisi's algorithm, a group-based sparse representation (GSR) algorithm, a compression-oriented edge-based inpainting algorithm, an annihilating filter-based low-rank Hankel matrix approach (ALOHA) algorithm, an image melding using patch-based synthesis algorithm.

Optionally, the at least one processor is configured to:
  generate a plurality of depth maps of the real-world environment from the corresponding poses of the user's head with respect to which the plurality of images are captured; and
  employ the plurality of depth maps when creating the three-dimensional model of the real-world environment.

Optionally, in this regard, the plurality of depth maps are generated using the plurality of images and the corresponding poses of the users head with respect to which the plurality of images are captured. The plurality of images are representative of depth information of the real-world environment from the perspectives of the poses of the user's head. Optionally, a depth camera is employed to capture pairs of stereo images, wherein, when generating a given depth map, the at least one processor is configured to match pixels of a given pair of stereo images that represent a given 3D point in the real-world environment and determine binocular disparities between matching pixels of the given pair of stereo images.

The term "depth map" refers to a data structure comprising information pertaining to the optical depths of objects or their portions within the real-world environment from a viewpoint. A depth map is indicative of an optical depth (namely, an optical distance) of a given feature in the real-world environment from the at least one camera, the given feature being extracted from an image of the real-world environment that is captured by the at least one camera. This image used for generating the depth map could be a video see-through (VST) image or a depth image. Optionally, the depth map is an image comprising a plurality of pixels, wherein a colour of each pixel indicates an optical depth of its corresponding real point/region within the real-world environment. It will be appreciated that employing the plurality of depth maps when creating the 3D model of the real-world environment enables the at least one processor to accurately represent the optical depths of objects or their portions within the real-world environment. Optionally, structured light is employed to enhance an accuracy of the optical depths in the 3D model.

In another embodiment, the at least one processor is configured to access the 3D model of the real-world environment from a data repository. In such a case, the 3D model is pre-stored at the data repository. The data repository may be implemented as a memory of the HMD, a memory of the computer coupled to the HMD, a cloud-based database arrangement, or similar. As an example, a 3D model of a room may be created previously (for example, by the at least one processor) and may be stored at the data repository. The 3D model may then be accessed as and when required. The 3D model could also be updated based upon recent images of the room.

Optionally, the 3D model of the real-world environment is shared between a plurality of display apparatuses. In such a case, the plurality of display apparatuses are used by a plurality of users in a same real-world environment. As an example, the real-world environment may be a gaming arcade wherein multiple users engage in a multi-player XR shooting game using multiple XR headsets. Each user may wear an XR headset on his/her head. The multiple users could be positioned at different locations within the gaming arcade. In such an example, a 3D model of the gaming arcade may be shared between the multiple XR headsets, and may be utilized to generate realistic XR images pertaining to the multi-player XR shooting game for the multiple XR headsets.

It will be appreciated that the given image of the real-world environment is captured from a certain pose of the users head. The head-tracking data corresponding to a time of capturing the given image is processed to determine the pose of the user's head with respect to which the given image is captured. The head-tracking data may be in form of images, IMU/TIMU values, motion sensor data values, magnetic field strength values, or similar. Optionally, the at least one processor is configured to correct a drift in the pose of the users head. Drift correction is performed in order to enable generation of realistic XR images in a manner that virtual content (for example, such as virtual objects) is appropriately placed with respect to real-world content, and optionally, undergoes realistic movement/deformation in the XR environment. Optionally, the at least one processor utilizes anchor markers arranged at known positions and known orientations within the real-world environment, to determine a required correction corresponding to the drift in the pose of the users head.

Optionally, the region of the 3D model that corresponds to the pose of the users head (with respect to which the given image is captured) is determined by mapping the pose of the users head onto the 3D model. This region of the 3D model would be represented in the given image, as it corresponds to a perspective of the pose of the users head. It will be appreciated that said region of the 3D model may be anywhere in the 3D model. In an example, a top-right portion of the 3D model may correspond to the pose of the user's head. In another example, a central portion of the 3D model may correspond to the pose of the users head.

Optionally, the at least one processor is configured to employ at least one feature-processing algorithm to extract features from the region of the 3D model and/or the given image. Examples of the features include, but are not limited to, edges, corners, blobs and ridges. It will be appreciated that feature extraction is well-known in the art. Examples of the at least one feature-processing algorithm include, but are not limited to: an edge-detection algorithm (for example, such as Canny edge detector, Deriche edge detector and the like), a corner-detection algorithm (for example, such as Harris & Stephens corner detector, Shi-Tomasi corner detector, Features from Accelerated Segment Test (FAST) corner detector and the like), a blob-detection algorithm (for example, such as Laplacian of Gaussian (LoG)-based blob detector, Difference of Gaussians (DoG)-based blob detector, Maximally Stable Extremal Regions (MSER) blob detector and the like), a feature descriptor algorithm (for example, such as Binary Robust Independent Elementary Features (BRIEF), Gradient Location and Orientation Histogram (GLOH), Histogram of Oriented Gradients (HOG) and the like), and a feature detector algorithm (for example, such as Scale-Invariant Feature Transform (SIFT), Oriented FAST and rotated BRIEF (ORB), Speeded Up Robust Features (SURF) and the like).

Herein, the phrase "detect at least one object" encompasses detecting a presence of a new object, detecting a change in a position of an existing object, and detecting a deformation in a shape of the existing object. The detection of the at least one object indicates a change that has occurred in the real-world environment in a time period between creation of the 3D model of the real-world environment and capture of the given image of the real-world environment.

Throughout the present disclosure, the term "object" encompasses a physical object, a part of the physical object, as well as a shadow casted by the physical object or its part. An object may be a living object (for example, such as humans, pets, and the like) or a non-living object (for example, such as a screen, a robot, a toy, and the like). Moreover, the object may be a moving object and/or a state-changing object. As an example, a screen of a television displays different images over a period of time. Therefore, the screen showing a given image at a given point in time would be detected as a new object in the real-world environment. As another example, it may be that a physical object is not visible in a given image, but its shadow is visible in the given image. In such a case, the shadow would be detected as an object present in the real-world environment. The shadow may be detected when its corresponding pixels in the given image are darker than a corresponding portion of the region of the 3D model. As yet another example, a robot may be capable of movement and may be present in different locations within the real-world environment over a period of time. The robot present at a given location at a given point in time would be detected as a new object in the real-world environment.

It will be appreciated that the comparison of the plurality of features extracted from the region of the 3D model with the plurality of features extracted from the given image is performed in a portion-wise manner or all at once. Notably, detection of the at least one object indicates that the given image represents additional visual information and/or different visual information from that represented in the region of the 3D model. This additional visual information and/or different visual information was not captured at a time of creating the 3D model of the real-world environment, and is therefore required to be added to the XR image that is to be displayed, for presenting an up to date XR environment to the user.

Optionally, the at least one processor is configured to apply a transform to the given image to match the given image with the region of the three-dimensional model prior to comparing. The transform enables proper matching of the given image with the region of the 3D model that corresponds to the pose of the users head at the time of capturing the given image. As a result, the comparison of extracted features from said region and the given image is more efficient, and the at least one object is detected accurately. Optionally, the transform pertains to at least one of: image scaling, image skewing, image resizing, image phase correction, image restructuring, image blurring, color space correction. Such transforms are well known in the art.

In an example, the transform applied to the given image may pertain to image phase correction. This enables in proper image phase correlation between the given image and the region of the 3D model, for sake of accurate feature comparison. In another example, the transform applied to the given image may pertain to image restructuring. In such a case, certain sub-areas of the given image may be internally restructured to match optical depths and features represented in the given image with optical depths and features in the 3D model. This may be done in a situation where optical depth comparison has a certain tolerance (for example, equal to 5 percent). Therefore, the transform is employed to ensure that a difference between the aforesaid optical depths lies within the certain tolerance. In yet another example, the transform applied to the given image may pertain to color space correction, and may be used to change a color space of the given image to match lighting in the given image and lighting in the region of the 3D model. In still another example, the transform applied to the given image may pertain to image blurring, and may be used to apply a gaussian blur, a linear blur, or similar, to selective pixels of the given image in a manner that blur effect is applied to a region lying within 5 degrees from a blur center per given pixel.

Optionally, the at least one processor is configured to compress the given image and/or the region of the 3D model prior to comparing. Such compression reduces a size of the given image and/or said region, to enable faster accessibility and processing thereof. Compression techniques employed by the at least one processor for performing such compression are well known in the art. Moreover, optionally, the at least one processor is configured to remove artifacts and/or distortions from the given image and/or the region of the 3D model prior to comparing.

Throughout the present disclosure, the term "environment map" refers to a three-dimensional data structure that is representative of the XR environment. The XR environment can be a VR environment, an AR environment or an MR environment. The environment map comprises comprehensive information pertaining to the XR environment. The environment map comprises information indicative of at least one of:
- optical depths of objects within the XR environment with respect to a given view point and a given view direction (for example, with respect to VST cameras of the display apparatus),
- features of the objects (for example, extracted from visible-light images of the real-world environment captured by the VST cameras),
- physical shapes of the objects (for example, as determined based on an analysis of the optical depths and the features of the objects),
- materials of the objects or their portions,
- lights and lighting conditions within the environment.

The intermediate XR image is generated in a manner that it represents a portion of the XR environment that corresponds to the pose of the users head.

When generating the intermediate XR image, the at least one processor is configured to: map the pose of the users head onto the environment map, to determine the portion of the XR environment that corresponds to the pose of the users head; and represent said portion of the XR environment in the intermediate XR image. The environment map comprises information pertaining to said portion of the XR environment; this information is used to accurately represent said portion in the intermediate XR image.

In some implementations, the intermediate XR image does not represent the real-world environment at all, whereas in other implementations, the intermediate XR image represents the real-world environment partially. In these other implementations, portions of the real-world environment that are to be represented in the intermediate XR image are extracted from the given image, and are suitably blended into XR content represented in the intermediate XR image.

Optionally, when embedding the at least one object in the intermediate XR image to generate the XR image, the at least one processor is configured to:
- crop an image segment of the given image that represents the at least one object; and
- superimpose the image segment over the intermediate XR image.

Throughout the present disclosure, the term "image segment" refers to a set of pixels that represents the at least one object. The image segment may have predefined shape (for example, such as a rectangle, a triangle, a circle, or similar), or an arbitrary shape (for example, such as a freeform shape). Optionally, the at least one processor is configured to apply at least one image processing algorithm to the image segment prior to superimposing the image segment over the intermediate XR image. As a result, the at least one object accurately represents virtual properties of the XR environment. These virtual properties include, for example, virtual lighting, virtual object occlusion, virtual textures, virtual shadows, and the like. Optionally, the at least one image processing algorithm is at least one of: a computer-generated imagery algorithm, an image sharpening algorithm, an image smoothing algorithm, an image blurring algorithm, an image colour-change algorithm, an image merging algorithm, an image layering algorithm, an image blending algorithm, an image special-effects algorithm.

It will be appreciated that the at least one object is embedded in the intermediate XR image using a blending technique to generate a realistic XR image. The blending technique may, for example, be depth estimation or alpha blending, or similar. The blending technique enabled in realistically mixing the at least one object with XR content (which may be only virtual content, or a combination of virtual content and real-world content). Additionally, other objects present in the real-world environment may also be embedded into the intermediate XR image using the blending technique.

Optionally, the display apparatus further comprises object-tracking means, wherein the at least one processor is configured to process object-tracking data, obtained from the object-tracking means, to determine a position of the at least one object relative to the users head, wherein, when generating the extended-reality image, the at least one processor is configured to embed the at least one object in the intermediate extended-reality image based on the position of the at least one object relative to the users head.

In this regard, a region of embedding the at least one object in the intermediate XR image corresponds to the position of the at least one object relative to the users head in the real-world environment. As a result, when the XR image generated using this intermediate XR image is viewed by the user, the at least one object appears to have a same position relative to the users head in the XR environment as the position of the at least one object relative to the users head in the real-world environment. Optionally, the at least one processor is configured to mark the region of embedding the at least one object in the intermediate XR image. Such marking may be performed by painting pixels of the region of embedding, outlining a boundary of the region of embedding, blurring pixels of the region of embedding, or similar.

The region of embedding the at least one object in the intermediate XR image may be defined as a 3D geometry mesh, a 3D volume or shape (such as a plane, a frustum, a sector, a segment, a direction, or similar), a texture mask, or a custom shader program that generates or modifies a mask. The marking of said region may be enabled by the user.

Throughout the present disclosure, the term "object-tracking means" refers to specialized equipment that is employed to detect and/or follow the position of the at least one object relative to the users head, within the real-world environment. In practice, the object-tracking means is actually employed to track the position of the at least one object relative to the pose of the HMD; the pose of the users head corresponds to the pose of the HMD as the HMD is worn by the user on his/her head. Additionally, optionally, at least one processor is configured to process the object-tracking data to determine an orientation of the at least one object relative to the users head. The object-tracking means could be implemented as an internal component of the HMD, as a tracking system external to the HMD, or as a combination thereof. The object-tracking means could be implemented as at least one of: an infrared camera (with or without use of structured light), a time-of-flight camera, stereo cameras (for stereo triangulation), a detectable object and a detector. In an example, the object-tracking means may be implemented as a marker (i.e. the detectable object) that is arranged on the at least one object and a detector such as a visible light camera that is arranged on an outer surface of the HMD that faces the at least one object.

Optionally, the at least one processor is configured to correct a drift in the position of the at least one object relative to the users head. Optionally, the at least one processor utilizes the anchor markers arranged at known positions and known orientations within the real-world environment, to determine a required correction corresponding to the drift in the position of the at least one object relative to the users head.

Optionally, the at least one processor is configured to at least partially virtualize the at least one object prior to embedding the at least one object in the intermediate extended-reality image. Virtualization changes appearance of the at least one object partly or fully, using computer graphics. In some implementations, the at least one object is fully virtualized, whereas in other implementations, the at least one object is partially virtualized. As an example, the at least one object may be a human, for example, such as an adult male. The at least one object may be fully virtualized to change the human into a superhero character (for example, such as Batman) prior to embedding in the intermediate XR image. As another example, the at least one object may be a human, for example, such as a girl. The at least one object may be partially virtualized to change only real clothes worn by the girl into different virtual clothes. As yet another example, the at least one object may be a vehicle, for example, such as a car. The at least one object may be partially virtualized to add a virtual luggage carrier on a roof of the car.

The at least one processor controls the at least one light source to display the XR image. The XR image may be displayed for a specific time period, based on a required frame rate for providing the user with a feeling of immersion in the XR environment.

Optionally, the at least one processor is configured to:
generate a depth map of the real-world environment from the pose of the user's head with respect to which the given image is captured; and
determine from the depth map an optical depth of a given pixel within an image segment of the given image, wherein the image segment represents the at least one object,
wherein, when embedding the at least one object, the at least one processor is configured to:
detect whether the optical depth of the given pixel of the given image is within a predefined depth threshold; and
overlay the given pixel of the given image on the intermediate extended-reality image when the optical depth of the given pixel is within the predefined depth threshold.

Optionally, capturing of image(s) used for the generation of the depth map and the capturing of the given image occurs simultaneously. The image(s) used for the generation of the depth map may be VST images and/or depth images. The "optical depth" of the given pixel refers to a distance of a region of the real-world environment represented by the given pixel from the users head. The given pixel represents a part of the at least one object. It will be appreciated that different pixels within the image segment may have different optical depths, as different parts of the at least one object may lie at different distances from the user's head. By optionally overlaying the given pixel of the given image on the intermediate XR image only when the optical depth of the given pixel is within the predefined depth threshold, the at least one processor generates the XR image to represent only that part of the at least one object which is near to the users head. The predefined depth threshold facilitates in local area mapping around the users eyes, wherein only detected object(s) in a local area within the predefined depth threshold are optionally represented in the XR image.

Optionally, the predefined depth threshold is specified by the user. This may be done prior to the start of the viewing session, or during the viewing session. Alternatively, optionally, the predefined depth threshold is pre-set by a manufacturer of the display apparatus. Yet alternatively, optionally, the predefined depth threshold is automatically selected by the at least one processor.

In an embodiment, the predefined depth threshold is defined as a single value for an entirety of the given image. As an example, the predefined threshold may be 1 meter. In such a case, all pixels within the image segment of the given image that represent a part of the real-world environment lying within 1 meter from the users head are overlaid on the intermediate XR image. Therefore, for example, a real-world control panel (of a helicopter hull) that lies at an optical depth of 0.7 meter from the users head would be represented in the XR image, multiple real-world people (such as crew members) present at optical depths ranging between 0.3 meter and 0.6 meter from the users head would be represented in the XR image, while a real-world robot that moves around at an optical depth of 1.5 meter from the users head would not be represented in the XR image. In place of the real-world robot, the XR may represent a virtual object such as a virtual helipad, a virtual sky, and the like.

In another embodiment, the predefined depth threshold is defined as a dynamic value that depends on a view direction from the pose of the users head. Moreover, the predefined depth threshold may also change with change in the pose of the users head, even when the view direction remains same. This embodiment is described in detail hereinbelow.

Optionally, the at least one processor is configured to:
obtain three-dimensional data representative of a bounding surface within the real-world environment; and determine the predefined depth threshold from the three-dimensional data, based on a direction vector pointing towards the given pixel.

Optionally, the 3D data representative of the bounding surface is in form of any one of: a 3D mesh, a point cloud, a voxel structure. Other forms of 3D data are also feasible. The bounding surface could have any possible shape and extent. Optionally, the at least one processor is configured to generate the 3D data by scanning an interior surface of an object, wherein the interior surface is the bounding surface. In an embodiment, the 3D data is generated by scanning an interior surface of a real vehicle. In another embodiment, the 3D data is computer generated to represent an interior surface of a virtual vehicle. The virtual vehicle may, for example, be used as in a simulator, for training and/or testing and development purposes. Throughout the present disclosure, the term "vehicle" encompasses land vehicles, aerial vehicles, water vehicles, space vehicles, or a combination of these. Examples of a given vehicle include, but are not limited to, a car, a truck, a spacecraft, a ship, a helicopter, and an airplane. For generating the 3D data representative of the bounding surface, the at least one processor optionally controls the at least one camera and/or any other suitable 3D scanning device arranged on the HMD.

The term "direction vector" refers to a vector representing a direction pointing towards the given pixel from the user's head. Optionally, the at least one processor determines the predefined depth threshold dynamically. Optionally, the predefined depth threshold is equal to a distance from the user's eyes to the bounding surface along the direction vector pointing from the users head to the given pixel. As an example, the bounding surface may be an interior surface of a helicopter hull. The helicopter hull could be real or virtual. The pose of the user's head may be such that a first predefined depth threshold from the user's head to a leftmost point of the bounding surface may be 0.6 metres, while a second predefined depth threshold from the user's head to a rightmost point of the bounding surface may be 1.4 metres. The first and second predefined depth thresholds would change dynamically with change in the pose of the user's head as the user moves within the real-world environment, bends forward, leans backwards, or similar.

Optionally, the at least one processor is configured to:
  determine whether the optical depth of the given pixel of the given image lies within a predefined depth margin from the predefined depth threshold; and
  overlay the given pixel of the given image on the intermediate extended-reality image when the optical depth of the given pixel lies within the predefined depth margin from the predefined depth threshold.

Optionally, in this regard, the predefined depth margin is added to the predefined depth threshold. Optionally, the predefined depth margin lies in a range of 0.1 percent to 20 percent of the predefined depth threshold. The predefined depth margin may, for example, be from 0.1, 0.5, 1, 2, 3, 4, 5, 6, 7, 8, 9, 10, 11, 12, 13, 14, 15, 16, 17, 18, or 19 percent up to 0.5, 1, 2, 3, 4, 5, 6, 7, 8, 9, 10, 11, 12, 13, 14, 15, 16, 17, 18, 19 or 20 percent of the predefined depth threshold.

As an example, the given pixel of within the image segment of the given image may represent a portion of a hand of a person, the predefined depth threshold may be equal to 1 meter, and the predefined depth margin may be 10 percent of the predefined depth threshold. In such an example, when embedding the at least one object in the intermediate XR image, the given pixel would be overlaid on the intermediate XR image as long as the optical depth of the given pixel is less than or equal to 1.1 meters from the users head. Employing the predefined depth margin prevents abrupt clipping of the hand of the person when the hand moves slightly beyond the predefined depth threshold. This enables in providing a realistic XR viewing experience to the user.

Optionally, when the optical depth of the given pixel is not within the predefined depth threshold and/or the predefined depth margin from the predefined depth threshold, the given pixel is not overlaid on the intermediate XR image.

For sake of illustration only, there will now be considered an example illustration wherein the real-world environment is an indoor environment of a room, wherein objects present in the real-world environment are detected as: hands of a user, physical controls (including a physical joystick and a throttle), and a green screen that optionally covers an area behind the physical controls. An XR environment to be presented to the user may be a MR flight simulation environment. In an intermediate XR image generated using an environment map of the MR flight simulation environment, there is represented a virtual flight simulator setup comprising a virtual cockpit and a virtual sky outside the virtual cockpit. The physical controls and the hands of the user may be embedded in the intermediate XR image to generate an XR image (specifically, an MR image) in a manner that the physical controls and the hands of the user occlude some virtual content in a corresponding region of the intermediate XR image. In other regions of the intermediate XR image, there may shown either the remaining virtual content, or virtual content blended with some real-world content.

The present disclosure also relates to the method as described above. Various embodiments and variants disclosed above, with respect to the aforementioned first aspect, apply mutatis mutandis to the method.

Optionally, the method further comprises:
  generating a depth map of the real-world environment from the pose of the users head with respect to which the given image is captured; and
  determining from the depth map an optical depth of a given pixel within an image segment of the given image, wherein the image segment represents the at least one object,
wherein the step of embedding the at least one object comprises:
  detecting whether the optical depth of the given pixel of the given image is within a predefined depth threshold; and
  overlaying the given pixel of the given image on the intermediate extended-reality image when the optical depth of the given pixel is within the predefined depth threshold.

Optionally, the method further comprises:
  obtaining three-dimensional data representative of a bounding surface within the real-world environment; and
  determining the predefined depth threshold from the three-dimensional data, based on a direction vector pointing towards the given pixel.

Optionally, when the display apparatus further comprises object-tracking means, the method further comprises processing object-tracking data, obtained from the object-tracking means, to determine a position of the at least one object relative to the users head,
  wherein the step of embedding the at least one object in the intermediate extended-reality image is performed based on the position of the at least one object relative to the users head.

Optionally, the method further comprises at least partially virtualizing the at least one object prior to embedding the at least one object in the intermediate extended-reality image.

Optionally, in the method, the step of obtaining the three-dimensional model of the real-world environment comprises:

controlling the at least one camera to capture a plurality of images of the real-world environment, whilst processing head-tracking data obtained from the head-tracking means to determine corresponding poses of the users head with respect to which the plurality of images are captured; and processing the plurality of images, based on the corresponding poses of the user's head, to create the three-dimensional model of the real-world environment.

Optionally, the method further comprises:

generating a plurality of depth maps of the real-world environment from the corresponding poses of the users head with respect to which the plurality of images are captured; and employing the plurality of depth maps when creating the three-dimensional model of the real-world environment.

Optionally, the method further comprises applying a transform to the given image to match the given image with the region of the three-dimensional model prior to comparing.

DETAILED DESCRIPTION OF THE DRAWINGS

Figure 1:
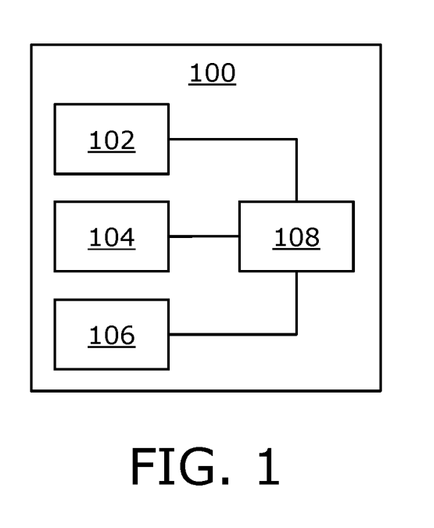
FIGS. 1 and 2 illustrate block diagrams of architectures of a display apparatus, in accordance with different embodiments of the present disclosure.

Referring to FIG. 1, illustrated is a block diagram of architecture of a display apparatus 100, in accordance with an embodiment of the present disclosure. The display apparatus 100 comprises at least one light source (depicted as a light source 102), at least one camera (depicted as a camera 104), head-tracking means 106, and at least one processor (depicted as a processor 108). The processor 108 is coupled to the light source 102, the camera 104, and the head-tracking means 106.

Figure 2:
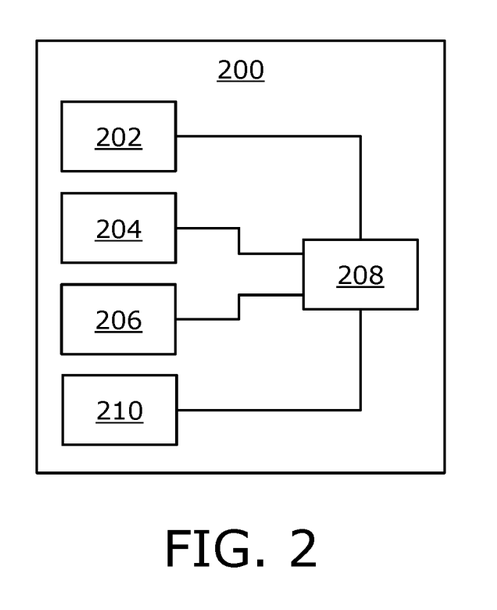

Referring to FIG. 2, illustrated is a block diagram of architecture of a display apparatus 200, in accordance with another embodiment of the present disclosure. The display apparatus 200 comprises at least one light source (depicted as a light source 202), at least one camera (depicted as a camera 204), head-tracking means 206, at least one processor (depicted as a processor 208), and object-tracking means 210. The processor 208 is coupled to the light source 202, the camera 204, the head-tracking means 206, and the object-tracking means 210.

It may be understood by a person skilled in the art that FIG. 1 and FIG. 2 include simplified architectures of the display apparatuses 100 and 200, respectively, for sake of clarity, which should not unduly limit the scope of the claims herein. The person skilled in the art will recognize many variations, alternatives, and modifications of embodiments of the present disclosure.

Figure 3A:
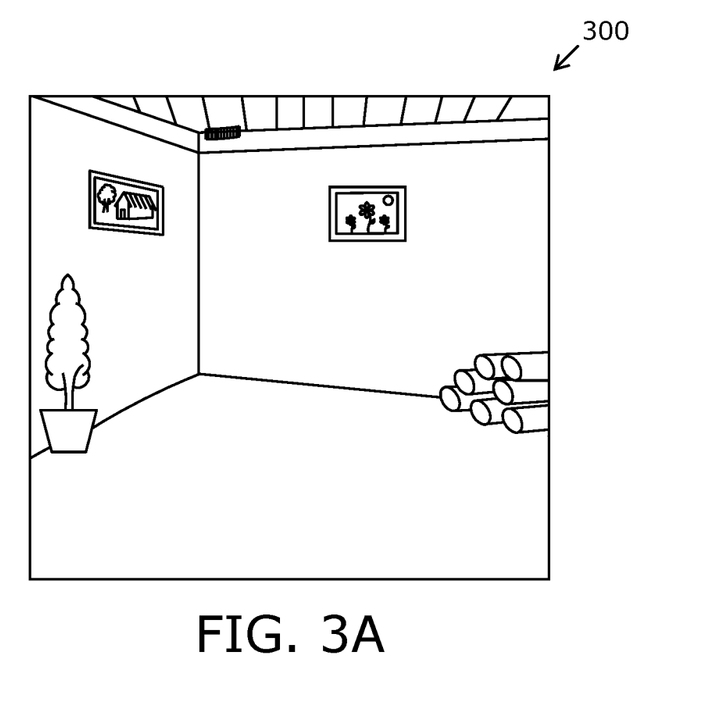
FIG. 3A is an exemplary illustration of an image of a real-world environment.
Figure 3B:
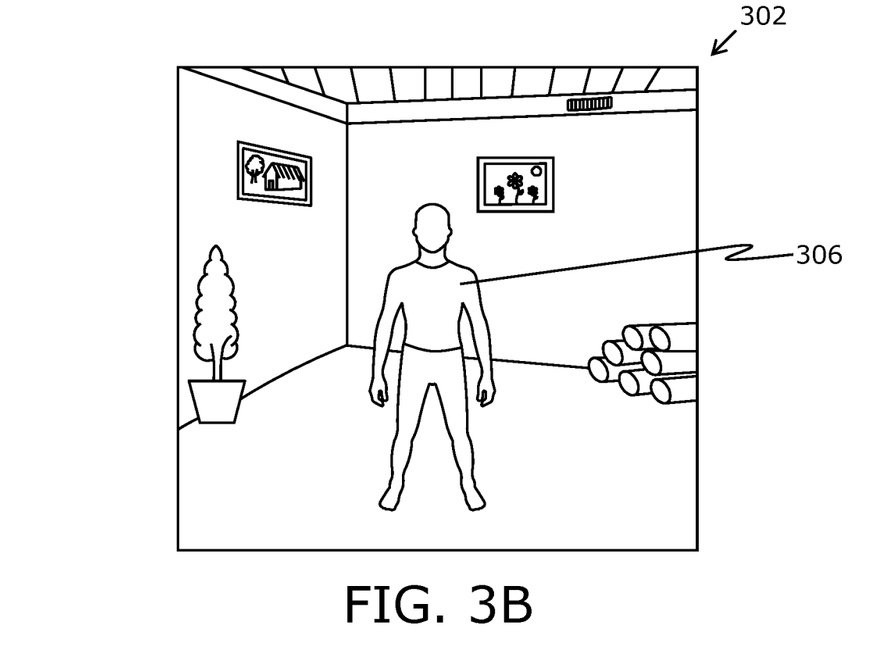
Figure 3C:
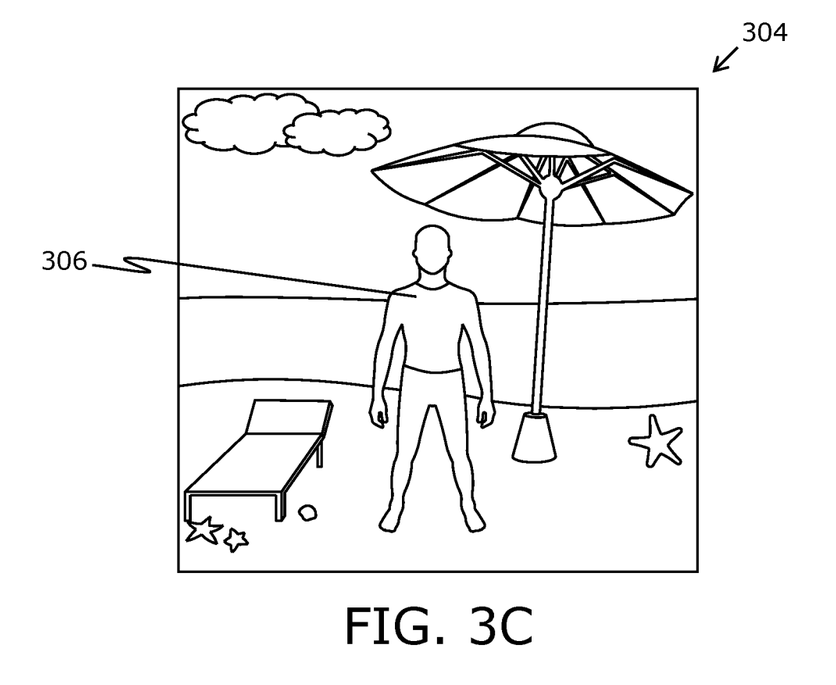
FIG. 3C is an exemplary illustration of an extended-reality image, in accordance with an embodiment of the present disclosure.

Referring to FIGS. 3A, 3B, and 3C, FIG. 3A is an exemplary illustration of an image 300 of a real-world environment, FIG. 3B is an exemplary illustration of a given image 302 of the real-world environment that is captured by at least one camera (not shown) of a display apparatus (not shown), while FIG. 3C is an exemplary illustration of an extended-reality image 304, in accordance with an embodiment of the present disclosure. The real-world environment is represented as an indoor environment of a room.

In FIG. 3A, the image 300 represents stationary objects present in the real-world environment. These stationary objects as depicted as a plant, wall paintings, paper rolls, and the like. The image 300 may be a part of a three-dimensional model of the real-world environment.

In FIG. 3B, the given image 302 represents an object 306, which is a person, in addition to the stationary objects represented in the image 300. The given image 302 is captured with respect to a pose of the users head. The object 306 may be detected by comparing a plurality of features extracted from a region of the three-dimensional model that corresponds to said pose of the users head with a plurality of features extracted from the given image 302. Said region is, for example, represented in the image 300.

In FIG. 3C, the extended-reality (XR) image 304 represents, for example, a mixed-reality (MR) beach environment. The mixed-reality beach environment includes virtual beach scenery as well as the object 306. The object 306 is embedded in an intermediate XR image (not shown) to generate the XR image 304. An environment map of the MR beach environment may be employed to generate the intermediate XR image representing the virtual beach scenery (including, for example, virtual beach sand, virtual beach umbrella, virtual clouds, virtual beach beds, and the like).

Figure 4A:
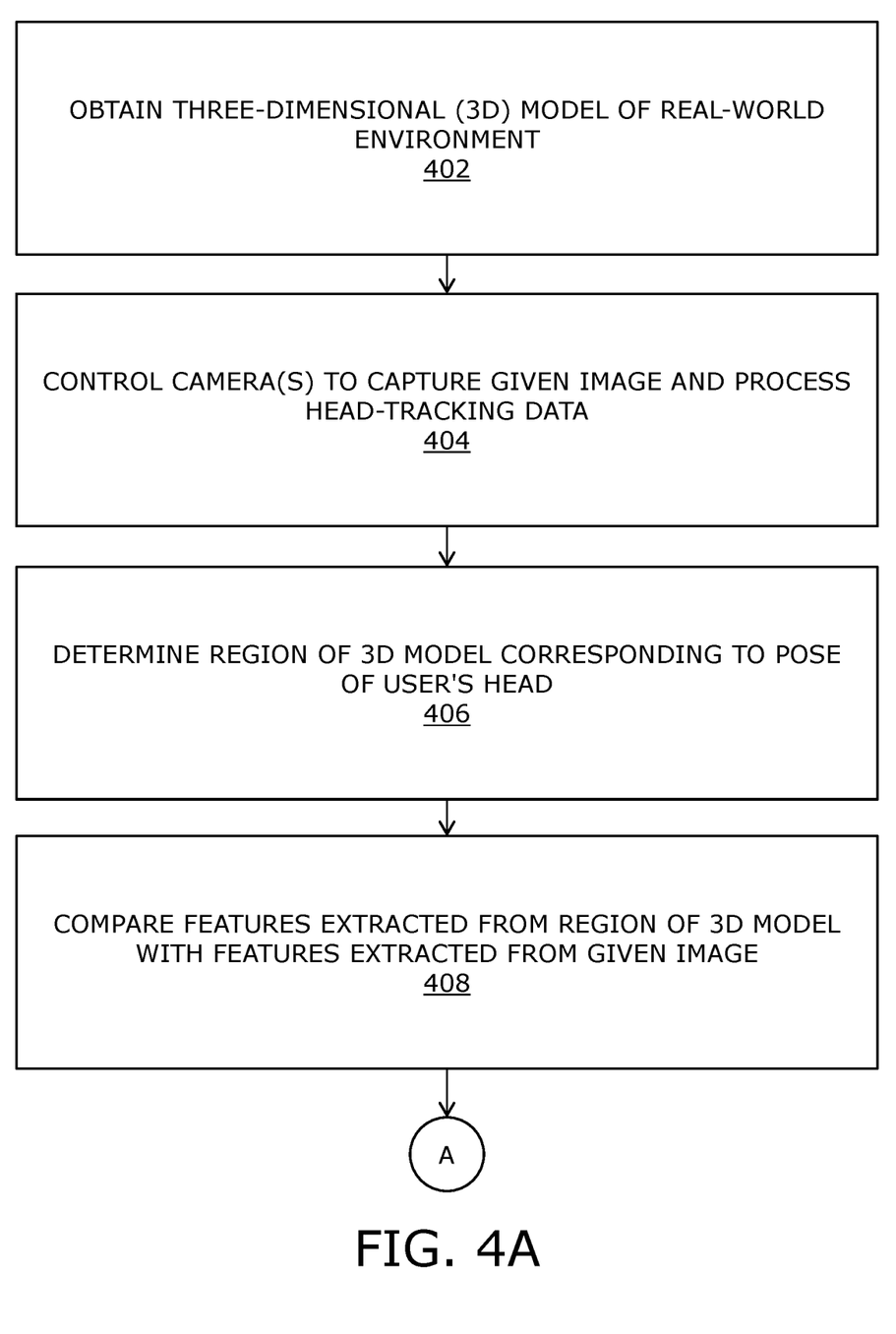
FIGS. 4A and 4B illustrate steps of a method of displaying, in accordance with an embodiment of the present disclosure.
Figure 4B:
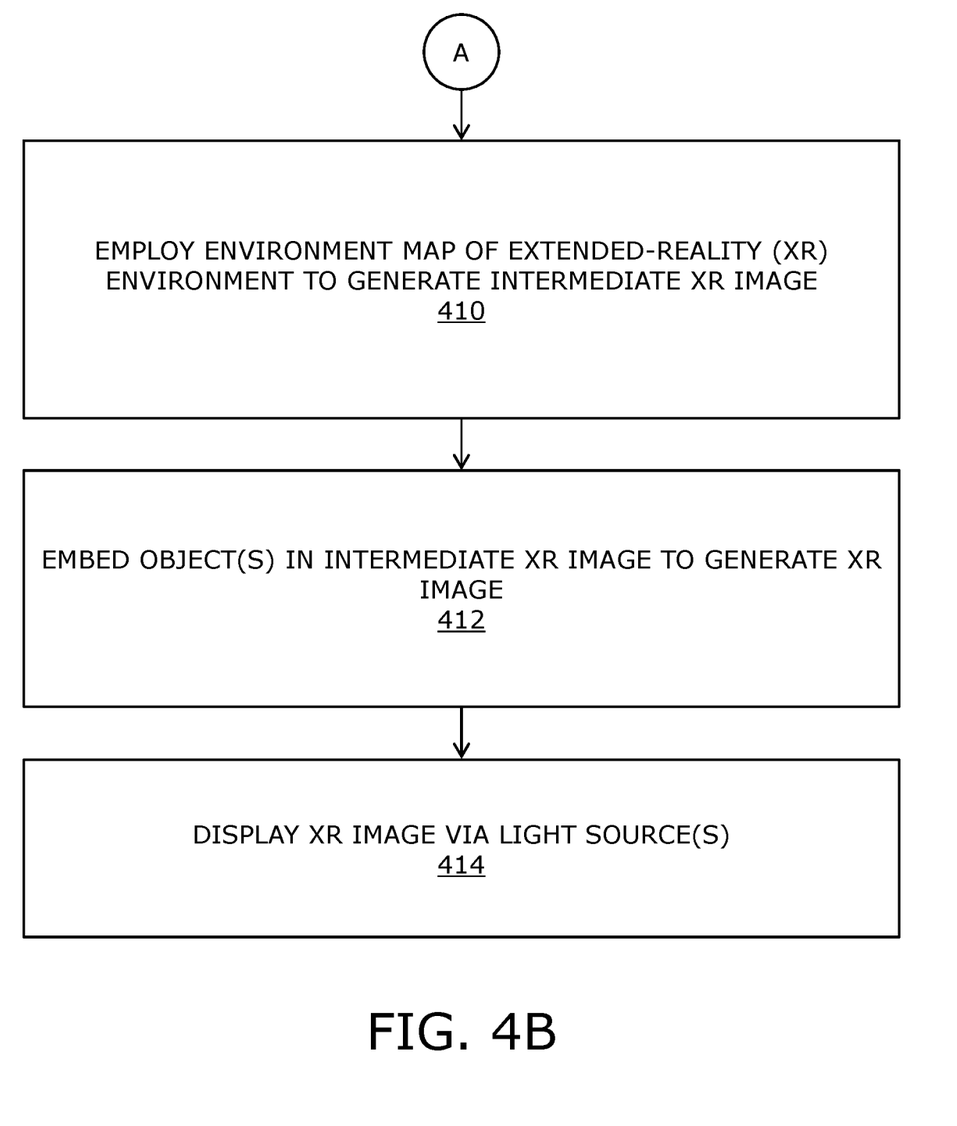

Referring to FIGS. 4A and 4B, illustrated are steps of a method of displaying, in accordance with an embodiment of the present disclosure. The method is implemented by a display apparatus comprising at least one light source, at least one camera, and head-tracking means. At step 402, a three-dimensional model of a real-world environment is obtained. At step 404, the at least one camera is controlled to capture a given image of the real-world environment, whilst head-tracking data obtained from the head-tracking means is processed to determine a pose of a users head with respect to which the given image is captured. At step 406, a region of the three-dimensional model that corresponds to said pose of the users head is determined. At step 408, a plurality of features extracted from the region of the three-dimensional model are compared with a plurality of features extracted from the given image, to detect at least one object present in the real-world environment. At step 410, an environment map of an extended-reality environment is employed to generate an intermediate extended-reality image based on the pose of the users head. At step 412, the at least one object in the intermediate extended-reality image is embedded to generate an extended-reality image. At step 414, the extended-reality image is displayed via the at least one light source.

The steps 402, 404, 406, 408, 410, 412, and 414 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A display apparatus comprising:
at least one light source;
at least one camera;
head-tracking means; and
at least one processor configured to:

obtain a three-dimensional model of a real-world environment;

control the at least one camera to capture a given image of the real-world environment, whilst processing head-tracking data obtained from the head-tracking means to determine a pose of a user's head with respect to which the given image is captured;

generate a depth map of the real-world environment from the pose of the user's head with respect to which the given image is captured;

determine a region of the three-dimensional model that corresponds to said pose of the user's head;

compare a plurality of features extracted from the region of the three-dimensional model with a plurality of features extracted from the given image, to detect at least one object present in the real-world environment;

determine from the depth map an optical depth of a given pixel within an image segment of the given image, wherein the image segment represents the at least one object, employ an environment map of an extended-reality environment to generate an intermediate extended-reality image based on the pose of the user's head;

embed the at least one object in the intermediate extended-reality image to generate an extended-reality image, wherein, when embedding the at least one object, the at least one processor is configured to:

detect whether the optical depth of the given pixel of the given image is within a predefined depth threshold;

overlay the given pixel of the given image on the intermediate extended-reality image when the optical depth of the given pixel is within the predefined depth threshold; and display the extended-reality image via the at least one light source.

2. The display apparatus of claim 1, wherein the at least one processor is configured to:

obtain three-dimensional data representative of a bounding surface within the real-world environment; and determine the predefined depth threshold from the three-dimensional data, based on a direction vector pointing towards the given pixel.

3. The display apparatus of claim 1, further comprising object-tracking means, wherein the at least one processor is configured to process object-tracking data, obtained from the object-tracking means, to determine a position of the at least one object relative to the user's head, wherein, when generating the extended-reality image, the at least one processor is configured to embed the at least one object in the intermediate extended-reality image based on the position of the at least one object relative to the user's head.

4. The display apparatus of claim 1, wherein the at least one processor is configured to at least partially virtualize the at least one object prior to embedding the at least one object in the intermediate extended-reality image.

5. The display apparatus of claim 1, wherein, when obtaining the three-dimensional model of the real-world environment, the at least one processor is configured to:

control the at least one camera to capture a plurality of images of the real-world environment, whilst processing head-tracking data obtained from the head-tracking means to determine corresponding poses of the user's head with respect to which the plurality of images are captured; and process the plurality of images, based on the corresponding poses of the user's head, to create the three-dimensional model of the real-world environment.

6. The display apparatus of claim 5, wherein the at least one processor is configured to:

generate a plurality of depth maps of the real-world environment from the corresponding poses of the user's head with respect to which the plurality of images are captured; and employ the plurality of depth maps when creating the three-dimensional model of the real-world environment.

7. The display apparatus of claim 1, wherein the at least one processor is configured to apply a transform to the given image to match the given image with the region of the three-dimensional model prior to comparing.

8. A method of displaying, the method being implemented by a display apparatus comprising at least one light source, at least one camera, and head-tracking means, the method comprising:

obtaining a three-dimensional model of a real-world environment;

controlling the at least one camera to capture a given image of the real-world environment, whilst processing head-tracking data obtained from the head-tracking means to determine a pose of a user's head with respect to which the given image is captured;

generating a depth map of the real-world environment from the pose of the user's head with respect to which the given image is captured;

determining a region of the three-dimensional model that corresponds to said pose of the user's head;

comparing a plurality of features extracted from the region of the three-dimensional model with a plurality of features extracted from the given image, to detect at least one object present in the real-world environment;

determining from the depth man an optical depth of a given pixel within an image segment of given image, wherein the image segment represents the at least one object, employing an environment map of an extended-reality environment to generate an intermediate extended-reality image based on the pose of the user's head;

embedding the at least one object in the intermediate extended-reality image to generate an extended-reality image, wherein embedding the at least one object comprises:

detecting whether the optical depth of the given pixel of the given image is within a predefined depth threshold; and overlaying the given pixel of the given image on the intermediate extended-reality images when the optical depth of the given pixel is within the predefined depth threshold; and displaying the extended-reality image via the at least one light source.

9. The method of claim 8, further comprising:

obtaining three-dimensional data representative of a bounding surface within the real-world environment; and determining the predefined depth threshold from the three-dimensional data, based on a direction vector pointing towards the given pixel.

10. The method of claim 8, wherein the display apparatus further comprises object-tracking means, wherein the method further comprises processing object-tracking data, obtained from the object-tracking means, to determine a position of the at least one object relative to the user's head,
    wherein the step of embedding the at least one object in the intermediate extended-reality image is performed based on the position of the at least one object relative to the user's head.

11. The method of claim 8, further comprising at least partially virtualizing the at least one object prior to embedding the at least one object in the intermediate extended-reality image.

12. The method of claim 8, wherein the step of obtaining the three-dimensional model of the real-world environment comprises:
    controlling the at least one camera to capture a plurality of images of the real-world environment, whilst processing head-tracking data obtained from the head-tracking means to determine corresponding poses of the user's head with respect to which the plurality of images are captured; and
    processing the plurality of images, based on the corresponding poses of the user's head, to create the three-dimensional model of the real-world environment.

13. The method of claim 12, further comprising:
    generating a plurality of depth maps of the real-world environment from the corresponding poses of the user's head with respect to which the plurality of images are captured; and
    employing the plurality of depth maps when creating the three-dimensional model of the real-world environment.

14. The method of claim 8, further comprising applying a transform to the given image to match the given image with the region of the three-dimensional model prior to comparing.

* * * * *